(12) United States Patent
Paranjpe et al.

(10) Patent No.: US 12,712,847 B2
(45) Date of Patent: Aug. 18, 2026

(54) SYSTEM AND METHOD OF SECURE NETWORK MANAGEMENT USING A REVERSE PROXY SERVER

(71) Applicant: Microsoft Technology Licensing, LLC, Redmond, WA (US)

(72) Inventors: Anish Paranjpe, Bellevue, WA (US); Seth Girouard Reisinger, Snoqualmie, WA (US); Roberto Yeriel Guzman-Ortiz, Bellevue, WA (US); Nirag Tibdewal, Bothell, WA (US); Vikram Dadwal, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 18/587,433

(22) Filed: Feb. 26, 2024

(65) Prior Publication Data

US 2025/0274432 A1 Aug. 28, 2025

(51) Int. Cl.
*H04L 9/40* (2022.01)
*H04L 61/4511* (2022.01)

(52) U.S. Cl.
CPC ...... *H04L 63/0236* (2013.01); *H04L 61/4511* (2022.05); *H04L 63/0263* (2013.01)

(58) Field of Classification Search
CPC ............. H04L 63/0236; H04L 61/4511; H04L 63/0263; H04L 61/5076; H04L 63/02; H04L 61/2528; H04L 67/2895
See application file for complete search history.

(56) References Cited

U.S. PATENT DOCUMENTS 11,863,528 B1 * 1/2024 Chung .................... H04L 69/22
12,212,635 B2 * 1/2025 Ayyadevara ........ H04L 63/0884
(Continued)

FOREIGN PATENT DOCUMENTS

WO 2002039699 A1 5/2002

OTHER PUBLICATIONS

Aung, Si Thu, and Thandar Thein. "Comparative analysis of site-to-site layer 2 virtual private networks." 2020 IEEE Conference on Computer Applications (ICCA). IEEE, 2020. (Year: 2020).*
(Continued)

*Primary Examiner* — Jimmy H Tran
(74) *Attorney, Agent, or Firm* — Novo TechIP International PLLC

(57) ABSTRACT

A method and system for securely routing traffic in a computing environment via a firewall, the method including configuring a reverse proxy server via a first configuration file and configuring a DNS server via a second configuration file, and routing traffic via the reverse proxy server by looking up addresses in the DNS server. The first configuration file includes a plurality of target IP addresses, each of the plurality of target IP addresses referencing a DNS record in the DNS server and the second configuration file includes a plurality of DNS records, where each of the DNS records is initially set to point to a default IP address. When it is determined that there is a change to an IP address of a resource in the computing environment, the DNS record associated with the resource in the DNS server is automatically updated via an API call to the DNS server by replacing the default IP address with the updated IP address for the resource. The reverse proxy servers refers to the updated DNS record to route traffic to the resource.

20 Claims, 6 Drawing Sheets

(56) References Cited

U.S. PATENT DOCUMENTS

| | | | | |
|---|---|---|---|---|
| 2002/0065938 | A1* | 5/2002 | Jungck | H04L 63/0263 709/246 |
| 2006/0101026 | A1 | 5/2006 | Fukushima | |
| 2011/0153697 | A1* | 6/2011 | Nickolov | H04L 67/1014 707/827 |
| 2015/0058488 | A1* | 2/2015 | Backholm | H04L 61/58 709/226 |
| 2015/0135302 | A1* | 5/2015 | Cohen | G06F 21/128 726/12 |
| 2015/0229629 | A1* | 8/2015 | Ishaya | H04L 67/10 726/4 |
| 2015/0326640 | A1* | 11/2015 | Jellick | G06F 16/23 709/217 |
| 2016/0112375 | A1* | 4/2016 | Cohen | H04L 67/34 726/23 |
| 2016/0261502 | A1* | 9/2016 | Donovan | H04L 47/11 |
| 2017/0295131 | A1* | 10/2017 | Dyszynski | H04L 69/163 |
| 2018/0077121 | A1* | 3/2018 | Gordon | H04L 63/0281 |
| 2019/0132280 | A1* | 5/2019 | Meuninck | H04L 45/50 |
| 2019/0158353 | A1* | 5/2019 | Johnson | H04L 63/0823 |
| 2020/0322374 | A1 | 10/2020 | Holloway | |
| 2021/0250330 | A1* | 8/2021 | Gurney | H04L 63/0236 |
| 2022/0263793 | A1* | 8/2022 | Baker | H04L 61/2557 |
| 2022/0417053 | A1* | 12/2022 | Wright | H04L 12/2818 |
| 2023/0133809 | A1* | 5/2023 | Ayyadevara | H04L 63/0884 709/225 |
| 2025/0158989 | A1* | 5/2025 | Howe | H04L 63/20 |
| 2025/0158990 | A1* | 5/2025 | Howe | H04L 63/10 |
| 2025/0159022 | A1* | 5/2025 | Howe | H04L 63/20 |
| 2025/0159023 | A1* | 5/2025 | Howe | H04L 63/10 |
| 2025/0184221 | A1* | 6/2025 | Marques | H04L 41/084 |

OTHER PUBLICATIONS

Penaflor Rey, William, and Kieth Wilhelm Jan Dugang Rey. "Designing secure and scalable end-to-end private network connections between sites via overlay tunnels." Proceedings of the 2022 5th International Conference on Electronics, Communications and Control Engineering. 2022. (Year: 2022).*

"Create Hardware Firewall", Retrieved From: https://cloud.ibm.com/netsec/firewalls/single-server/provision#about, Retrieved on Feb. 24, 2021, 3 Pages.

"HAProxy as a TCP reverse proxy with DDNS target discovery and load balancing", Retrieved From: https://blog.jitdor.com/2020/06/17/haproxy-as-a-tcp-reverse-proxy-with-ddns-target-discovery-and-load-balancing/2/#:~:text=Jitdor%20Tech%20Tips-,HAProxy%20as%20a%20TCP%20reverse%20proxy%20with%20DDNS%20target%20discovery,resolve%20them%20by%20DNS%20names., Dec. 12, 2023, 4 Pages.

"Quotas and limits", Retrieved From https://cloud.google.com/vpc/docs/quota#per_network, Retrieved on Feb. 22, 2024, 19 Pages.

Assmann, Baptiste, "DNS for Service Discovery in HAProxy", Retrieved From: https://www.haproxy.com/blog/dns-service-discovery-haproxy, Jun. 14, 2019, 14 Pages.

Benomar, et al., "A Cloud-Based and Dynamic DNS Approach to Enable the Web of Things", IEEE Transactions on Network Science and Engineering, vol. 09, Issue No. 06, Sep. 8, 2021, pp. 3968-3978.

Extended European Search Report received for EP Application No. 251590899, mailed on Jul. 10, 2025, 12 pages.

Raza, et al., "URL fonNarding for NAT traversal", 2015 IFIP/IEEE International Symposium on Integrated Network Management (IM), May 2015, pp. 599-605.

* cited by examiner

SYSTEM AND METHOD OF SECURE NETWORK MANAGEMENT USING A REVERSE PROXY SERVER

BACKGROUND

In an era dominated by digital connectivity, many enterprise faces the ever-growing challenge of managing an increasing number of inbound network flows efficiently and securely. One way in which some enterprises provide a secure and well-managed network environment is by utilizing a firewall. There are many firewall providers that offer both cloud and on-premise solutions with a diverse spectrum of choices for safeguarding networks and data. Use of these firewalls solutions enables users to securely access resources across a network. Many enterprises have thousands or millions of users who attempt to securely connect to a resource via a firewall. To achieve this within the current firewall systems, a significant number of Network Address Translation (NAT) rules have to be defined. Many system require frequent changes to these NAT rules when there is an update to the firewall infrastructure. This is a cumbersome and costly process that makes it increasingly difficult to utilize a firewall for managing an increasing number of inbound network flows. Furthermore, most of the currently available firewall solutions require frequent manual updates to the proxy configuration used for the system. This is also an inefficient process that makes using a firewall for routing traffic costly and challenging.

Hence, there is a need for improved systems and methods of providing secure network management via a firewall.

SUMMARY

In one general aspect, the instant disclosure describes a data processing system having a processor and a memory in communication with the processor, where the memory comprises executable instructions that, when executed by the processor, cause the data processing system to perform multiple functions. These functions include a Domain Name System (DNS) server, a reverse proxy server and a computing platform supporting element. The DNS server is configured via a first configuration file that includes a plurality of DNS records and the plurality of DNS records are set to point to a default IP address. The reverse proxy server is configured via a second configuration file that includes a plurality of target DNS records, where each of the plurality of target DNS records reference one of the IP addresses in the DNS server. The computing platform supporting element detects when a change to an IP address of a resource in the computer environment is made, and in response to the detection, utilizes an Application Programming Interface (API) call to the DNS server to update a DNS record associated with the resource in the DNS server. In response to the API call, the DNS server automatically updates the DNS record associated with the resource in the DNS server, and the reverse proxy server refers to the updated DNS record to route traffic via the firewall to the resource.

In another general aspect the instant disclosure describes a method for method for securely routing traffic in a computing environment via a firewall. The method includes configuring a reverse proxy server via a first configuration file, configuring the DNS server via a second configuration file, determining that there is a change to an IP address of a resource in the computing environment; upon determining that there is the change to the IP address of the resource in the computing environment, automatically updating a DNS record associated with the resource in the DNS server via an Application Programming Interface (API) call to the DNS server, the DNS record being one of the plurality of DNS records. The first configuration file includes a plurality of target DNS records, each of the plurality of target DNS records referencing an IP address in a DNS server. The second configuration file includes a plurality of DNS records, and the plurality of DNS records are set to point to a default IP address. Updating the DNS record includes replacing the default IP address in the DNS record with the updated IP address for the resource, and the reverse proxy servers refers to the updated DNS record in the DNS server to route traffic via the firewall to the resource.

In yet another general aspect, the instant disclosure describes a non-transitory computer readable medium on which are stored instructions that when executed cause a programmable device to perform functions of receiving a request from a user to access a resource in the cloud computing environment; determining, using an Access Control List (ACL), whether access to the resource is allowed for the user; upon determining that access to the resource is allowed for the user, routing the request to a reverse proxy server; looking up an IP address for the resource in a configuration file of the reverse proxy server, the configuration file including a plurality of target DNS records, each target DNS records referencing a DNS record in a DNS server; referring to the DNS record in the DNS server to identify the IP address for the resource; and routing the request to the identified IP address via the firewall. When there is a change to the IP address of the resource in the computing environment, an API call is made to the DNS server to update the DNS record associated with the resource in the DNS server, and the reverse proxy server refers to the updated DNS record to route traffic via the firewall to the resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
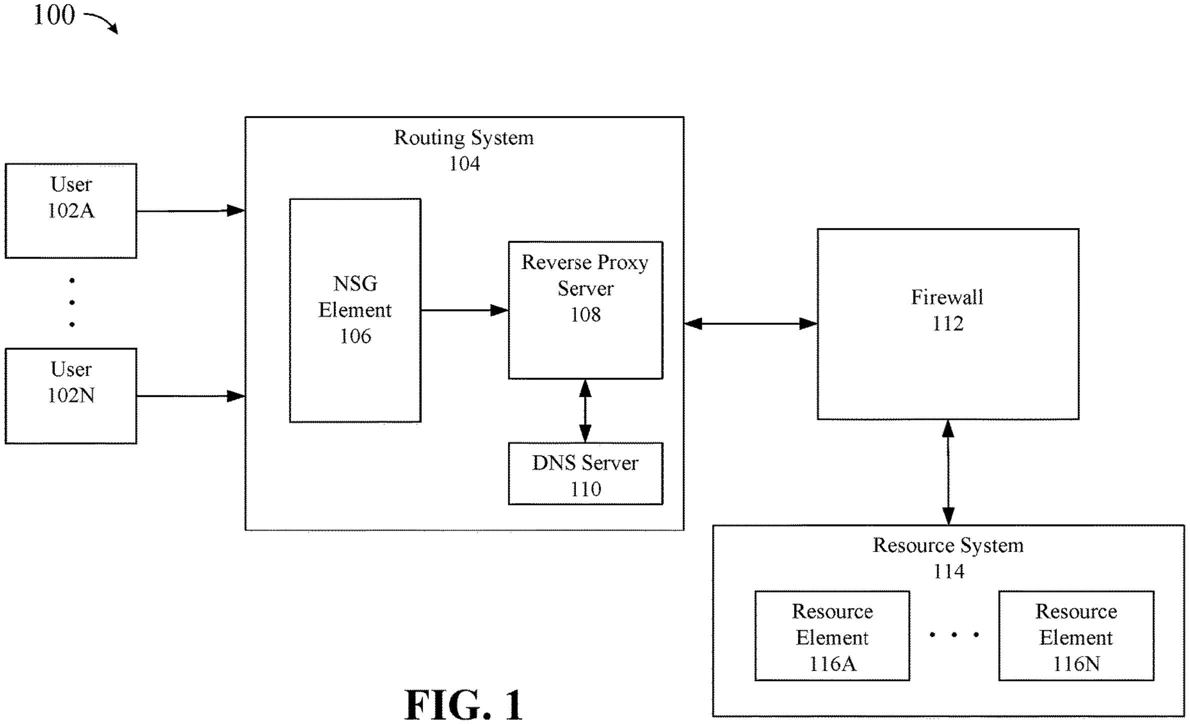
FIG. 1 illustrates an example system upon which aspects of this disclosure may be implemented.

Companies that route traffic and provide access to secure resources often have a need to provide a secure network connection to such secure resources. One way in which secure connection to a resource is provided is by routing network traffic through a firewall. Firewalls are used by many enterprises to enhance security and customer satisfaction. Today, there are many firewall providers that offer both cloud and on-premise solutions providing a diverse spectrum of choices for companies seeking to safeguard their network environments and secure their data. However, use of currently available cloud-based firewall systems requires defining many Network Address Translation (NAT) rules within the firewall and/or manually updating routing rules within a reverse proxy server, when the firewall is routing data to many backend servers. This means that each time there is a change to an element of the backend infrastructure, which necessitates a routing update, a person would need to manually revise a NAT rule in the firewall and/or manually update a routing rule in a reverse proxy server. This often requires that the system goes offline for a period of time to update configuration items. These requirements are cumbersome and inefficient and result in a nonoptimal use of computing resources. Thus, there exists a technical problem of inefficiency of current cloud-based firewall systems in routing network traffic.

To address these technical problems and more, in an example, this description provides a technical solution for providing a firewall system in which a reverse proxy server is used in combination with Domain Name System (DNS) server in which DNS records are updated automatically in response to changes in the computing environment. The DNS server maintains private and/or public Domain Name System (DNS) records to which the reverse proxy server refers for routing data. Changes to the network environment (e.g., the data center) in this system only require updating the DNS records maintained by the DNS server instead of a need for updating NAT or routing rules in the reverse proxy server. Changes to the DNS records are made dynamically and automatically via an Application Programming Interface (API) call to the DNS server, thus obviating the need for manual updates. In this manner, the technical solution eliminates the need to define any NAT rules within a firewall or update routing rules within a reverse proxy server after the initial configuration. The firewall system disclosed herein leverages a static reverse proxy server with predefined DNS records and port maps to route traffic while maintaining the ability to send network traffic through a firewall. By simply updating a private or public DNS record, the system can establish routing rules without needing to update the firewall or reverse proxy server. Furthermore, to improve security, the DNS entries can be updated to block traffic or redirect it as needed. This collaboration provides a comprehensive solution for optimizing network performance, enhancing security measures, and ultimately ensuring high inbound traffic flows can be supported without a need to deploy multiple instances of the firewall.

The technical solution described herein addresses the technical problem of inability of current firewall systems to route traffic without the need to define NAT rules, limitations due to the limited number of NAT rules available within the firewalls, and the need for modifying the proxy server when there is a change in the data center. The technical solution provides an efficient mechanism for routing a significantly large amount of traffic securely and efficiently, without needing to take the system offline or perform manual updates. The technical advantage includes improving the operation of computing systems used for securely routing traffic and securely providing access to computing resources such as virtual machines. The technical effects at least include (1) improving the operation of computing systems by efficiently and securely routing network traffic through a computing environment without the need to take one or more elements of the system offline when a change is made to the resources of the system; (2) increasing the number of rules that can be used to route traffic; and (3) reducing the amount of time and memory required to update a proxy server when there is a change in the data environment.

FIG. 1 illustrates an example system 100, upon which aspects of this disclosure may be implemented. The system 100 includes a plurality of users 102A-102N, a routing system 104, a firewall 112, and a resource system 114. Different users 102A-102N and/or systems may need to connect to a resource securely and choose to do so via a firewall such as the firewall 112. Users 102A-102N (collectively or individually referred to as user 102) represent any individual user or any system, server or service that attempts to connect to and/or access a resource of the resource system 114. System and services that may make such requests include enterprise servers or services that may need to access a resource for various reasons. In practice, requests for connection to and/or access to a resource securely may be received from many different client devices and services. A user 102 may make queries to or send a request for access to a resource of the resource system 114. The user submits the request via a client device or server (not shown).

The resource system 114 may include a plurality of resource elements 116A-116N (collectively or individually referred to as user 102). Each of the resource elements 116A-116N may be a separate physical or virtual server or virtual machine. One or more of the resource elements 116A-116N may be data stores or other storage elements. Furthermore, one or more of the resource elements 116A-116N may be servers or virtual machines (VMs) that provide various services. In some implementations, each resource element 116A-116N stores a different type of data and/or provides a different type of service. The resource elements 116A-116N may be located in the same geographical region or may be in completely different geographical regions (e.g., different countries or continents). Together the resource elements 116A-116N represent resources that can be accessed securely via a firewall. In some implementations, the resource elements 116A-116N are secured resource elements for which the system 100 requires the use of a firewall. In other implementations, it is the user 102 who requests access to the resource element 116 via a firewall.

To securely connect the user 102 to a resource element 116, the system 100 makes use of the routing system 104. In some implementations, the routing system 104 is a Virtual Machine (VM) that hosts the reverse proxy server 108. The VM that hosts the reverse proxy server 108 is parented, in an example, to a Virtual Network (VNet) and the VNet is peered (connected) to the firewall 112 (the firewall appliance). In an example, the reverse proxy server is a NGINX® server. In some implementations, the routing system 104 includes a Network Security Group (NSG) element 106. In addition, the routing system 104 includes, the reverse proxy server 108 and a DNS server 110. The NSG element 106 is a security component that can filter traffic to and from resources that have been commissioned on a VNet. To achieve this, the NSG element 106 may include a set of access control rules assigned to one or more resource elements 116 of the resource system 114. The access control rules may determine if a given user 102 is allowed access to a resource element 116 and/or the type of access allowed. When the NSG element 106 determines that access to the requested resource element 116 is allowed, the request is transmitted to the reverse proxy server 108.

The reverse proxy server 108 is a static reverse proxy server which maintains a static configuration for routing traffic after initial deployment. In an example, the reverse proxy server 108 is a NGINX® VM. The reverse proxy server 108 is configured by using a configuration file that references DNS records hosted on the DNS server 110. Thus, the reverse proxy server 108 utilizes predefined DNS records and port maps to route traffic while maintaining the ability to send network traffic through a firewall. The DNS server 110 may be a private DNS server that hosts DNS A and/or DNS AAA records for routing traffic. As is known in the art, public DNS servers are often publicly on the Internet, which makes them vulnerable to attack. By using a private DNS server, the system 200 ensures exposure to external threats is limited and provides additional security. The DNS server 110 is a dynamic and/or dedicated DNS server that operates alongside the proxy server to achieve secure network transmission efficiently. An example of configuration of the reverse proxy server 108 is provided below.

20000→backend0.dns.myapp:443
20001→backend1.myapp:80
20002→backend2.dns.myapp:22
20004→backend3.dns.myapp:3389

In some implementations, DNS A records are initially configured on the DNS server 110 by setting the DNS A records to point to 0.0.0.0 (e.g., the records are black holed). In networking, a black hole is used to refers to a place in the network where incoming/outgoing traffic is discarded, without informing the source that the data did not reach its intended recipient. Then, when a request is made for a specific routing change, the update is performed by directly modifying the black holed DNS A record on the DNS server 110. This approach eliminates the need to update the reverse proxy configuration for every change in target IP addresses. By modifying the DNS A record, the reverse proxy server 108 automatically adapts to an updated IP address by respecting the DNS time to live (TTL) on the DNS record without requiring manual configuration adjustments to the reverse proxy server 108. By simply updating a private or public DNS record, the system 100 establishes routing rules without needing to update the firewall 112 or reverse proxy server 108. Thus, the need for frequent manual updates to the reverse proxy server 108 is eliminated. This enhances the flexibility of routing traffic dynamically. An example of configuration of the DNS server 110 is provided below.

backend0.dns.myapp→10.32.1.5
backend1.dns.myapp→10.32.1.6
backend2.dns.myapp→0.0.0.0
.
backend2500.dns.myapp→10.32.1.4
.
backend2501.dns.myapp→0.0.0.0

Various elements of the system 100 may be connected to each other via one or more networks (not shown). The system 100 may be implemented on a single site or spread out in a number of facilities or geographically separated locations. Various elements of the routing system 104 may also be spread out in a number of facilities or geographically separated locations.

Figure 2:
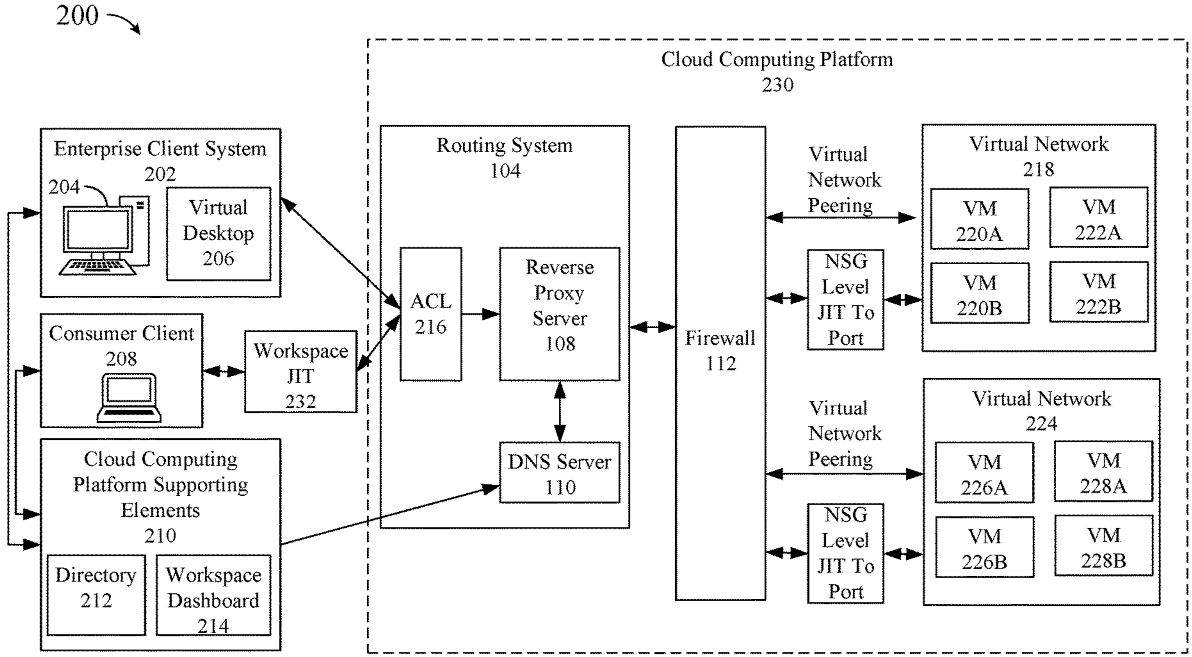
FIG. 2 illustrates a specific example implementation system upon which aspects of this disclosure may be implemented.

FIG. 2 is an example of data flow between some elements of a computing platform system 200 that utilizes aspects of this disclosure. A request to access, connect with and/or transmit data to a computing resource such as a virtual machine in a virtual network may be received from different types of users and/or computing clients. In an example, the request to access or connect with is received from an enterprise client system 202. The enterprise client system 202 may include a number of enterprise users (e.g., individual users) that utilize individual client devices such as the client device 204 to connect to a resource. The enterprise client system 202 may also enable users to utilize a virtual desktop system such as the virtual desktop 206 to connect to resources. The virtual desktop 206 is a system that virtualizes an operating system by providing virtual desktops and/or applications securely in the cloud to users associated with an enterprise. The client device 204 is representative of a client device used by an enterprise user to access a cloud-based resource via a cloud-based firewall. It should be noted that while only one client device 204 and virtual desktop 206 are displayed in the enterprise client system 202, many more client devices and virtual desktops may be included in an enterprise client system.

The request to access and/or connect with a resource may also be received from a consumer client device 208. The client devices 204 and/or 208 may be a type of personal, business or handheld computing device having or being connected to input/output elements that enable a user to interact with various applications to request access to a resource securely. Examples of suitable client devices include but are not limited to personal computers, desktop computers, laptop computers, mobile telephones, smart phones, tablets, phablets, smart watches, wearable computers, gaming devices/computers, televisions, and the like. The internal hardware structure of a client device and/or server is discussed in greater detail with respect to FIGS. 4 and 5.

A request for accessing a resource may be transmitted from the enterprise client system 202 to the ACL 216 of the routing system 104. In some implementations, an authentication request from the enterprise client system 202 and/or the consumer client 208 is first transmitted to a cloud computing platform supporting elements 210, which may include a directory 212 and a workspace dashboard 214. The directory may be a directory used by a cloud computing platform such as the cloud computing platform 230 that stores data about users, enterprises, devices, applications and the like associated with the cloud computing platform. The directory 212 may include information about various users and enterprises that enables the cloud computing platform supporting elements 210 to determine if a user/client is authenticated for access to the cloud computing platform 230 and/or specific resources in the cloud computing platform 230. The workspace dashboard 214 may be an application, add-on or another software element that provides a communication interface and management plane where users can create requests that update the DNS records and NSG to facilitate access to the resources (e.g., virtual machines.). It should be noted that while the cloud computing platform supporting elements 210 is displayed outside of the cloud computing platform 230, the elements 210 may be a part of the cloud computing platform 230. In some implementations, the cloud computing platform supporting elements 210 includes the engine the connects various resources such as the VMs to the backend environment. As a result, the cloud computing platform supporting elements 210 is aware of the IP addresses and ports in use and is able to detect changes to the IP addresses and/or ports without the users noticing a change.

Once the user/client is authenticated, they may utilize the authentication information such as an access code or access token to transmit a request for access/connection to a resource of the cloud computing platform 230. A request from the enterprise client system 202 (e.g. client device 204 or virtual desktop 206) may be directly transmitted to an ACL 216. In an example, the ACL 216 is a Just-in-Time (JIT) Access Control List (ACL). A JIT is a request that enables traffic flow to the resources a user would like to access (e.g., servers, virtual machines, etc.). JIT access is a cybersecurity approach that allows for time-limited access to resources and minimizes the risk of unauthorized access. In some implementations, the ACL 216 is an NSG element. The ACL 216 includes a set of access control rules associated with one or more resources of the cloud computing platform 230. The access control rules may determine if a given client is allowed access to a resource element and/or the type of access allowed (e.g., block or allow). When the ACL 216 determines that a requested access to a requested resource is allowed, the request is transmitted to the reverse proxy server 108 which references the DNS server for routing information.

In some implementations, requests for access from consumer clients such as the consumer client 208 are first transmitted to a Workspace JIT 232, before being routed to the ACL 216, which determines if the requested access should be transmitted to the reverse proxy server 108. The reverse proxy server 108 utilizes its configuration, which points to DNS records in the DNS server 110 to route the traffic correctly. In an example, the reverse proxy server 108 is an open resource reverse proxy server. As discussed above, the DNS server 110 may be a private DNS server that hosts DNS A records for routing traffic.

In some implementations, the DNS server 110 is a dedicated DNS server that operates alongside the reverse proxy server 108 to achieve secure network transmission. The DNS records in the DNS server are initially set to 0.0.0.0 and then updated as JIT requests occur to update the ACL 216. Prepopulating every possible DNS record that may be needed is achieved by utilizing a configuration file that sets the initial state of the DNS server 110 (e.g., a configuration file that initially configures the DNS server 110). In some implementations, the configuration files includes many lines that pre-create a record. Each record is defaulted to an IP address of 0.0.0.0., and the record is updated when access to the underlying resource (e.g. VM) is required (e.g., JIT). At that point, the record is updated to the correct IP address for the resource. In some implementations, the system 200 automatically inserts the correct forwarding IP address based on the JIT request made and subsequently makes changes in the DNS records replacing the 0.0.0.0 address with the IP address of the resource, when a change is made in the system.

The reverse proxy server 108 does not need to be updated or modified, as dynamic configuration of the DNS server 110 enables updates to occur without the need to manually update the reverse proxy server 108. Updating of the DNS records in the DNS server 110 is achieved by relying on the cloud computing platform's native calls to the DNS zone in order to update the records. In some implementations, this is achieved by utilizing a control-plane API that handles all of the manipulation of the A records in the private DNS zone in order to route traffic. Thus, the system disclosed herein leverages an API to automatically modify DNS records that are tied to a reverse proxy server. The reverse proxy server 108 is used to lookup the DNS records in the DNS server 110. This is achieved by providing a wrapper around the private DNS zone in the cloud computing platform to manipulate the DNS records and configure the reverse proxy server to leverage the records. In an example, the wrapper is an API call. In an example, the cloud computing platform supporting elements 210 automatically detects and makes the changes to the DNS server by utilizing an API call to the DNS server 110 to modify the record associated with the change in the system. Configuration of the reverse proxy server is achieved via a static configuration file. Thus, runtime changes to the reverse proxy server or significant changes to the underlying systems are not required to utilize the technical solution disclosed herein. The changes to the DNS records are made automatically, thus obviating the need for manual changes which are both time consuming and error prone.

One of the advantages of utilizing the DNS server 110 to update records is that utilizing the DNS server results in overcoming the limitations of the limited capacity for security rules that can be used with a firewall. With this configuration, the system can greatly increase the number of NAT rules available for the system and can leverage multiple reverse proxy servers in order to increase capacity. In practice, it is possible to exceed a firewall's throughput limit before NAT rule definitions are exhausted. A firewall such as the firewall 112 normally has a limited capacity for the number of NAT rules that can be set (e.g., 250 to 300 NAT rules). By using the system 200, the number of NAT rules that can be used can be significantly increased by implementing the NAT rules within the reverse proxy server. This is achieved by translating the network traffic from the source IP addresses and custom port extensions to the private IP address of the reverse proxy server and then routing the traffic to the firewall via a Next Hop definition. The forwarding IP addresses are fully qualified domain names (FQDN) that are stored in the reverse proxy server and are referenced by the DNS server.

Furthermore, the system 200 requires zero downtime for updating routing information, as the DNS server 110 is able to update the records to propagate any new routes. Furthermore, the system 200 enhances security by peering the private internet server to the firewall 112 and routing all traffic through the firewall while still maintaining quick NAT rules. In some implementations, the system includes additional elements in front of the routing system 104 to only allow trusted clients/services to reach the reverse proxy server 108.

Once the reverse proxy server 108 looks up the record in the DNS server 110, it utilizes the record to route the traffic to the firewall 112. The firewall 112 may be cloud-based or physical firewall. As discussed above, the firewall 112 can normally make use of a limited number of network security rules (e.g. NAT rules) that allow the firewall to monitor and control the flow of traffic. By using the routing system 104, which makes use of the reverse proxy server 108 in combination with the DNS server 110, the number of security rules that may be implemented and used can be greatly increased. Further, it is possible to leverage multiple reverse proxy servers in order to increase capacity. The firewall routes the data to the appropriate resource. As discussed above, a resource may have a variety of different type of physical or virtual devices in the cloud computing platform. In the implementation shown in FIG. 2, the resources are VMs within one or more virtual networks such as the virtual network 218 and the virtual network 224. It should be noted that while only two virtual networks are shown in FIG. 2, different computing platforms may have any number of virtual networks. Each virtual network includes one or more sets of VMs. Virtual network 218 includes a first set of VMs 220A and 220B and a second set of VMs 222A and 222B. Virtual network 224 includes a first set of VMs 226A and 226B and a second set of VMs 228A and 228B. The firewall 112 routes the traffic to the virtual network 218 or 224 via virtual network peering and/or via an NSG level JIT to Port access. This provides in-bound security measures by relying on JIT procedures to provide limited access and ensures that traffic is routed correctly to the VMs. Using JIT measures ensures that each VM can only be accessed for a given period of time (e.g., a short period of time). Once access goes beyond the allocated time period, access to the VM is blocked.

In this manner, system 200 eliminates the need to define NAT rules within a firewall or update routing rules within a reverse proxy server. Instead, system 200 leverages the static reverse proxy server 108 with predefined DNS records and port maps to route traffic while maintaining the ability to send network traffic through the firewall. By simply updating a private or public DNS record in the DNS server, the system 200 establishes routing rules without needing to update the firewall or reverse proxy server. This collaboration provides a comprehensive solution for optimizing network performance, enhancing security measures, and ultimately ensuring high inbound flows can be supported without a need to deploy multiple instances of the firewall.

Figure 3:
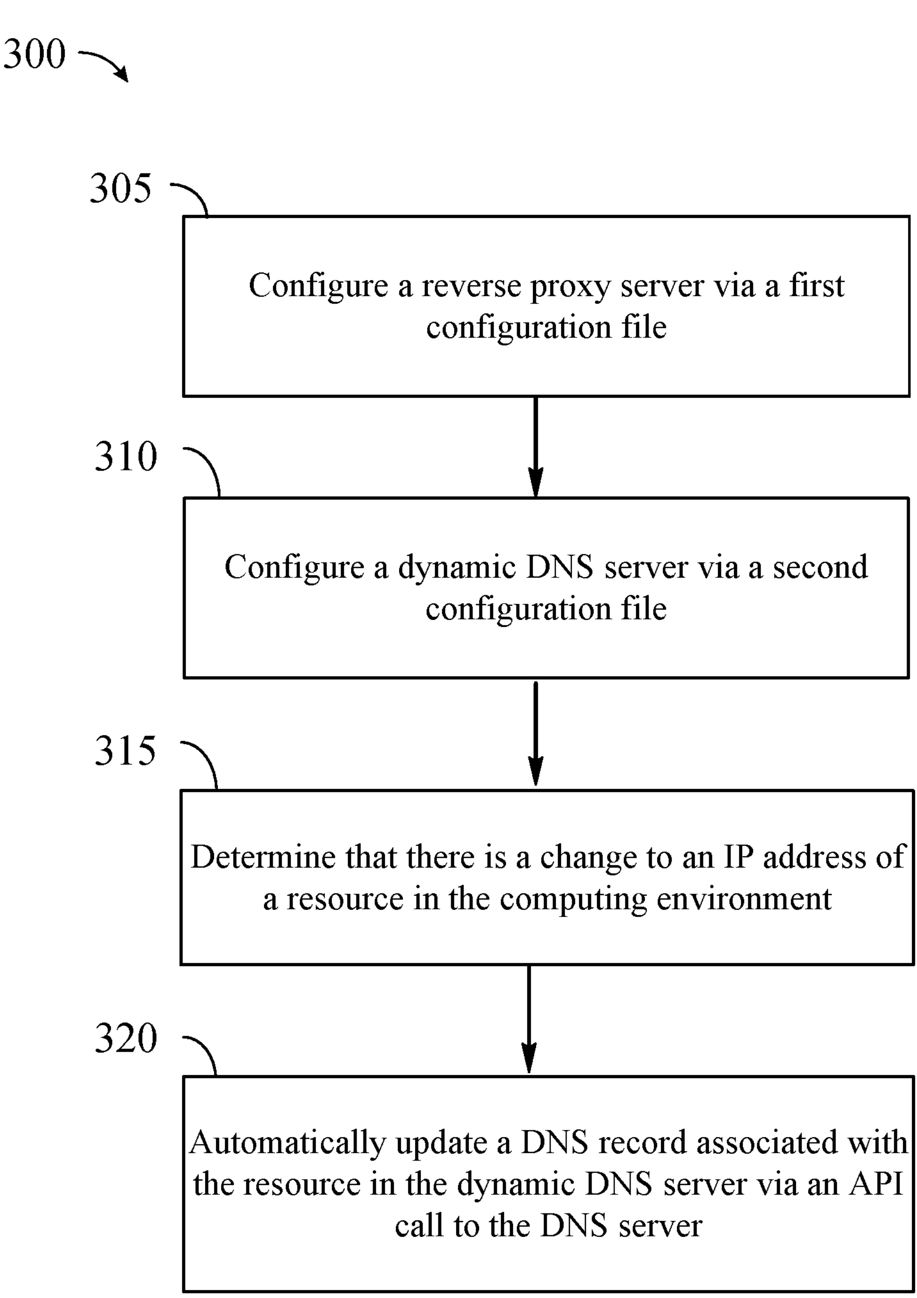
FIG. 3 is a flow diagram showing an example method for routing traffic in a computing environment via a firewall.

FIG. 3 is a flow diagram showing an example method for routing traffic in a computing environment via a firewall. In an example, one or more steps of method 300 are performed by a routing system of a cloud computing system such as the routing system 104 of FIGS. 1-2. In some implementations, method 300 begins by configuring a reverse proxy server via a first configuration file, at 305. This is performed as part of the initial configuration of the reverse proxy server, as after the initial configuration, additional changes to the IP addresses in the reverse proxy server are not needed. The first configuration file includes a plurality of target IP addresses, each of the plurality of target IP addresses referencing a DNS record in a dynamic DNS server. The first configuration file is a static configuration file, and the reverse proxy server is a static reverse proxy server that is not changed after the initial configuration.

In addition to configuring the reverse proxy server, method 300 also configures a dynamic DNS server via a second configuration file, at 310. The second configuration file includes a plurality of DNS records, where one or more of the plurality of DNS records are set to point to a default IP address. In some implementations, the default IP address is 0.0.0.0. Method 300 then proceeds to monitor the computing environment to determine that there is a change to an IP address of a resource in the computing environment, at 315. This is achieved, in some implementations, by utilizing a computing platform supporting element that automatically detects when a change to an IP address of a resource in the computer environment is made, and in response to the detection, utilizes an API call to the dynamic DNS server to update a DNS record associated with the resource in the dynamic DNS server.

Method 300 then proceeds to automatically update a DNS record associated with the resource in the dynamic DNS server in response to the API call to the DNS server, at 320. In an example, the supporting infrastructure component of the computing environment that detects the change to the resource makes the API call to the DNS server to update the DNS record. Updating the DNS record includes replacing the default IP address in the DNS record with the updated IP address for the resource. Once the IP address is updated, the reverse proxy servers refers to the updated DNS record in the DNS server to route traffic via the firewall to the resource. In this manner, when there is a change in the resource of the computing environment (e.g., changes in the data center), the change is automatically detected and implemented in the DNS records. As a result, when there is a change in the computing environment that requires updating of records, no changes to the NAT rules in the firewall are needed to correctly route traffic via the firewall. Furthermore, no changes to the reverse proxy server is needed to correctly route traffic as the reverse proxy server looks up the IP address via the DNS record.

Figure 4:
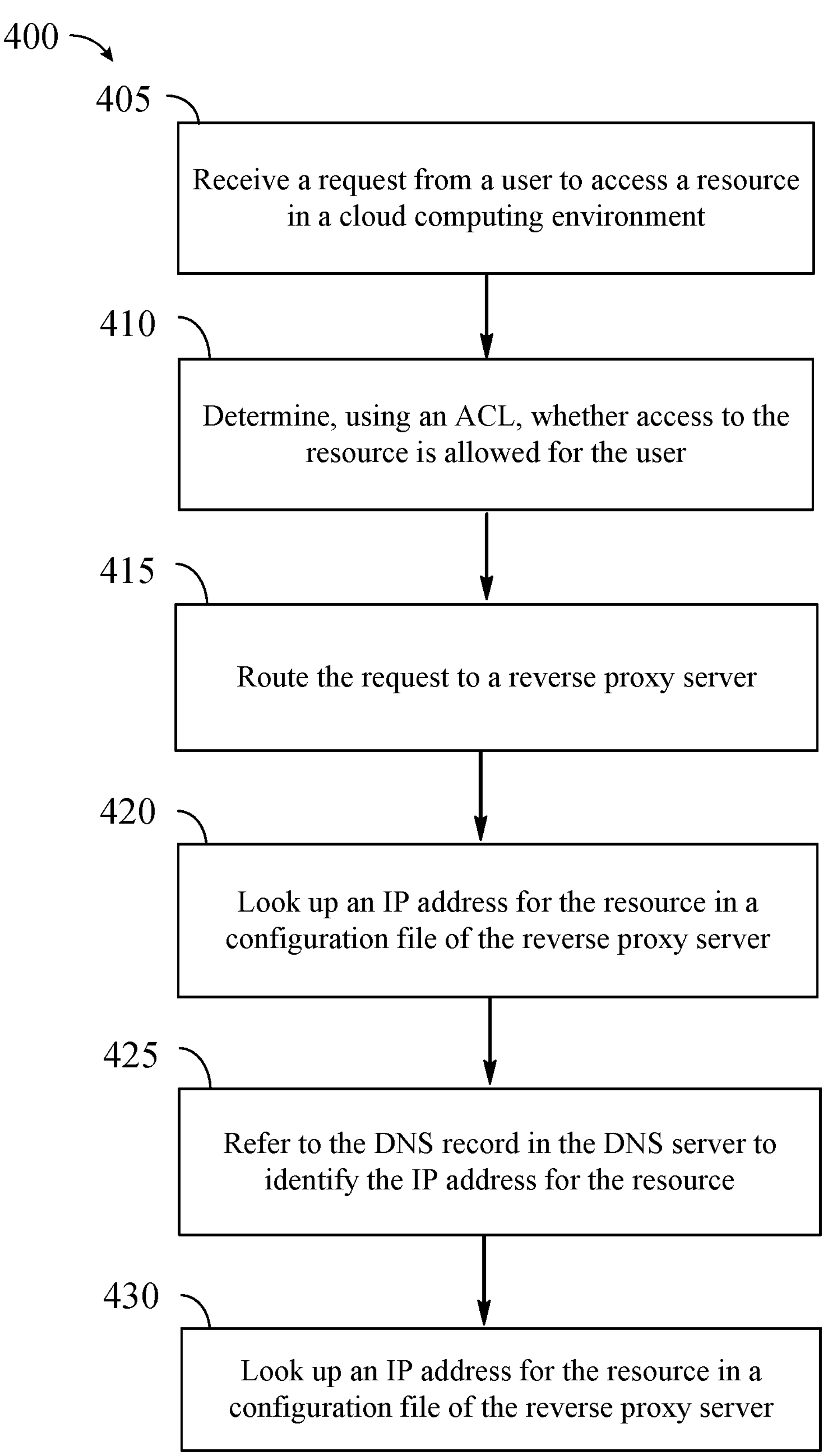
FIG. 4 is a flow diagram showing an example method for routing traffic via a firewall in a cloud computing environment.

FIG. 4 is a flow diagram showing an example method for routing traffic via a firewall in a cloud computing environment. In an example, one or more steps of method 400 are performed by a routing system of a cloud computing system such as the routing system 104 of FIGS. 1-2. In some implementations, method 400 begins by receiving a request from a user to access a resource in the cloud computing environment, at 405. The request may be received from an enterprise client system or a consumer client device. Upon receiving the request, method 400 determines using an Access Control List (ACL), whether access to the resource is allowed for the user, at 410. The ACL may be a JIT ACL or it may be a NSG component.

Upon determining that access to the resource is allowed for the user, method 400 routes the request to a reverse proxy server, at 415. The reverse proxy server then looks up an IP address for the resource in a configuration file of the reverse proxy server, at 420. The configuration file includes a plurality of target IP addresses, each target IP address referencing a DNS record in a DNS server. The configuration file is a static configuration file and the target IP addresses in the configuration file are not changed after the initial configuration.

The reverse proxy server refers to the DNS record in the DNS server to identify the IP address for the resource, at 425. Method 400 then routes the request to the identified IP address via the firewall, at 430. By using method 400, when there is a change to the IP address of the resource in the computer environment, an API call is made to the DNS server to update the DNS record associated with the resource in the DNS server. The reverse proxy server then refers to the updated DNS record to route traffic via the firewall to the resource.

Figure 5:
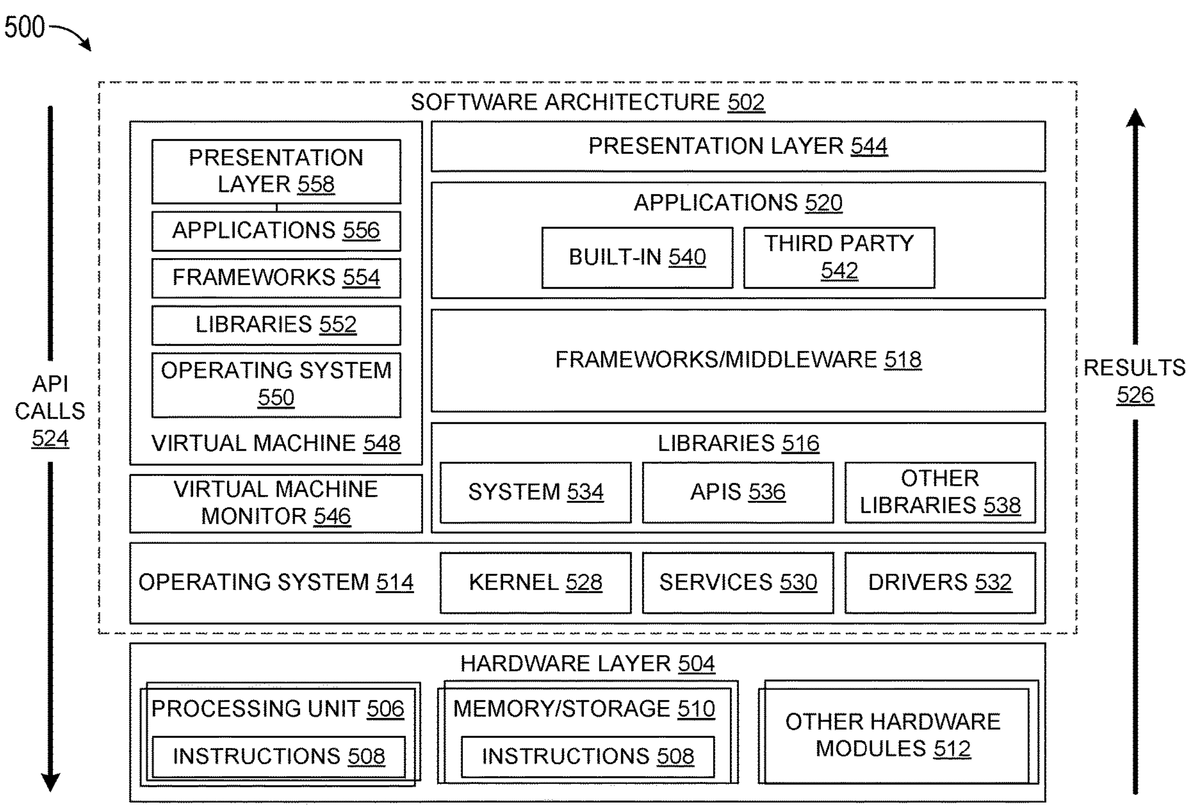
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
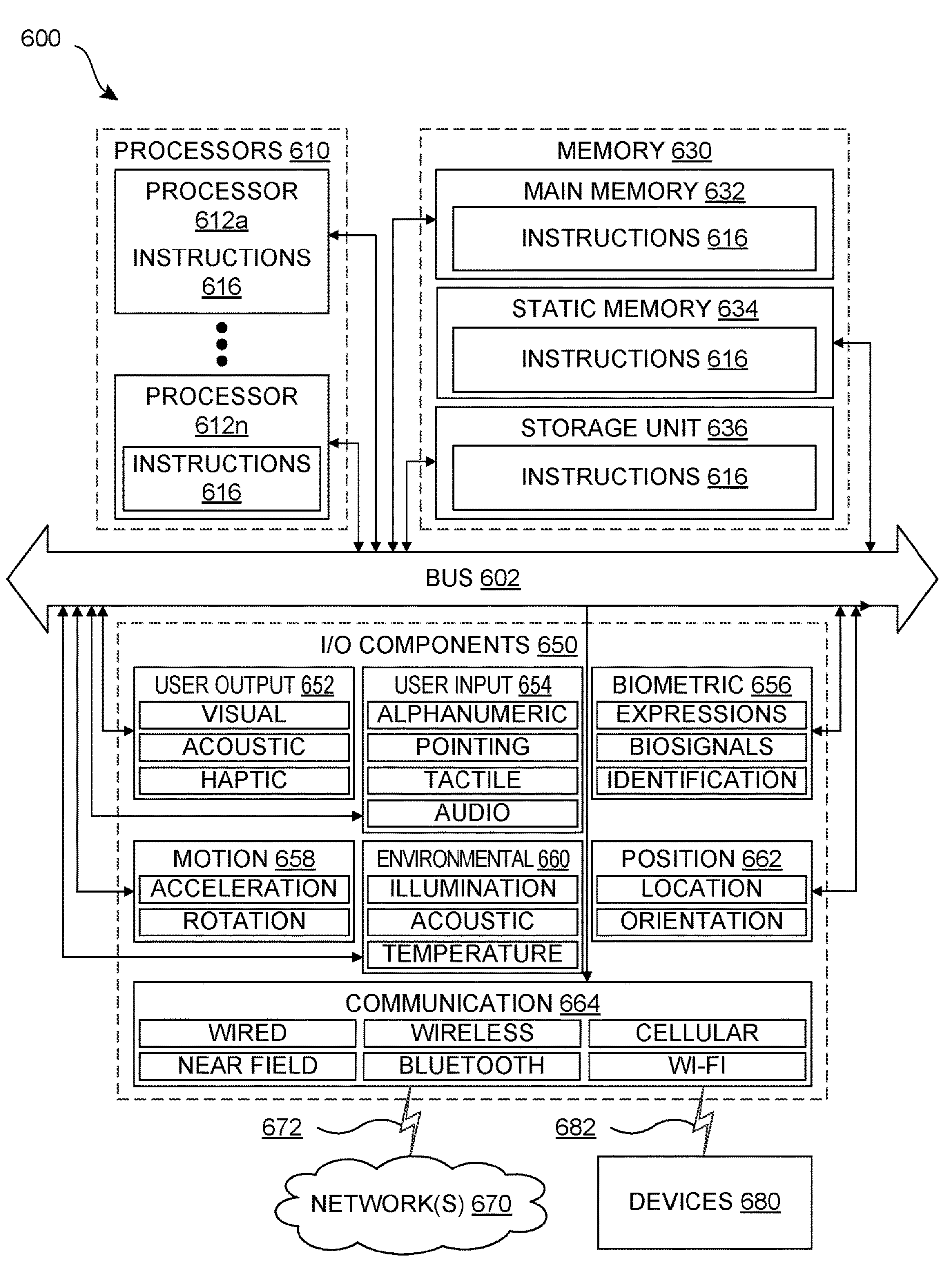
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors **612*a* to 612*n* that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600** may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for securely routing traffic in a computing environment to a resource system, the system comprising:

a reverse proxy server;

a firewall;

Domain Name System (DNS) server;

a processor; and a memory storing executable instructions that, when executed, cause the processor alone or in combination with other processors to perform operations of:

configuring the reverse proxy server via a first configuration file that includes a plurality of target IP addresses referencing a plurality of DNS records in the DNS server;

configuring the DNS server via a second configuration file that includes the plurality of DNS records previously configured to point to a default IP address;

detecting a change to an IP address of a resource element in the resource system;

upon detecting the change, updating a DNS record associated with the resource element in the DNS server via an Application Programming Interface (API) call to the DNS server, wherein updating the DNS record includes replacing the default IP address in the DNS record with an updated IP address for the resource element;

utilizing, by the reverse proxy server, the DNS record to route the traffic to the firewall; and routing, by the firewall, the traffic from the reverse proxy server to the resource element, wherein the firewall is statically configured with Network Address Translation (NAT) rules.

2. The system of claim 1, wherein the reverse proxy server is a static reverse proxy server.

3. The system of claim 1, wherein the DNS server is a private DNS server.

4. The system of claim 1, wherein the resource element comprises a virtual machine.

5. The system of claim 1, further comprising a network security group (NSG) element coupled to the reverse proxy server that filters the traffic by determining whether a user is allowed access to the resource element.

6. The system of claim 1, wherein the plurality of DNS records in the second configuration file are previously configured to point to the default IP address of 0.0.0.0.

7. The system of claim 1, wherein when the change to the IP address of the resource element in the computer environment is needed, the DNS record for the resource in the configuration file is updated to point to the updated IP address for the resource element.

8. The system of claim 1, wherein the firewall includes a static number of the NAT rules.

9. The system of claim 8, wherein when there is the change in the computing environment that requires updating of records, no updates to the NAT rules in the firewall are needed.

10. The system of claim 1, wherein when there is the change in the computing environment that requires updating of records, no updates to the reverse proxy server are needed to correctly route the traffic.

11. A method for securely routing traffic in a computing environment to a resource system, comprising:

configuring a reverse proxy server via a first configuration file that includes a plurality of target IP addresses referencing a plurality of Domain Name System (DNS) records in a DNS server;

configuring the DNS server via a second configuration file that includes the plurality of DNS records previously configured to point to a default IP address;

detecting a change to an IP address of a resource element in the resource system;

upon detecting the change, updating a DNS record associated with the resource element in the DNS server via an Application Programming Interface (API) call to the DNS server, wherein updating the DNS record includes replacing the default IP address in the DNS record with an updated IP address for the resource element;

utilizing, by the reverse proxy server, the DNS record to route the traffic to a firewall; and routing, by the firewall, the traffic from the reverse proxy server to the resource element, wherein the firewall is statically configured with Network Address Translation (NAT) rules.

12. The method of claim 11, wherein the default IP address is 0.0.0.0.

13. The method of claim 11, wherein the firewall includes a static number of the NAT rules.

14. The method of claim 13, wherein when there is the change in the computing environment that requires updating of records, no updates to the NAT rules in the firewall are needed to correctly route the traffic via the firewall.

15. The method of claim 11, wherein when there is the change in the computing environment that requires updating of records, no updates to the reverse proxy server are needed to correctly route the traffic via the firewall.

16. The method of claim 12, wherein the resource element is a virtual machine.

17. A non-transitory computer readable medium on which are stored instructions that when executed cause a programmable device for securely routing traffic in a computing environment to a resource system to perform functions of:

configuring a reverse proxy server via a first configuration file that includes a plurality of target IP addresses referencing a plurality of Domain Name System (DNS) records in a DNS server;

configuring the DNS server via a second configuration file that includes the plurality of DNS records previously configured to point to a default IP address;

detecting a change to an IP address of a resource element in the resource system;

upon detecting the change, updating a DNS record associated with the resource element in the DNS server via an Application Programming Interface (API) call to the DNS server, wherein updating the DNS record includes replacing the default IP address in the DNS record with an updated IP address for the resource element;

utilizing, by the reverse proxy server, the DNS record to route the traffic to a firewall; and routing, by the firewall, the traffic from the reverse proxy server to the resource element, wherein the firewall is statically configured with Network Address Translation (NAT) rules.

18. The non-transitory computer readable medium of claim 17, wherein the firewall includes a static number of Network Address Translation (NAT) rules.

19. The non-transitory computer readable medium of claim 18, wherein when there is the change in the computing environment that requires updating of records, no updates to the NAT rules in the firewall are needed to correctly route the traffic via the firewall.

20. The non-transitory computer readable medium of claim 17, wherein when there is the change in the computing environment that requires updating of records, no updates to the reverse proxy server are needed to correctly route the traffic via the firewall.

* * * * *